(12) United States Patent
Mikhemar et al.

(10) Patent No.: US 9,143,307 B2
(45) Date of Patent: Sep. 22, 2015

(54) LOW-LOSS LARGE-SIGNAL ELECTRICAL BALANCE DUPLEXER

(71) Applicant: BROADCOM CORPORATION, Irvine, CA (US)

(72) Inventors: Mohyee Mikhemar, Aliso Viejo, CA (US); Hooman Darabi, Laguna Niguel, CA (US)

(73) Assignee: BROADCOM CORPORATION, Irvine, CA (US)

( * ) Notice: Subject to any disclaimer, the term of this patent is extended or adjusted under 35 U.S.C. 154(b) by 283 days.

(21) Appl. No.: 13/688,007

(22) Filed: Nov. 28, 2012

(65) Prior Publication Data

US 2014/0146717 A1    May 29, 2014

(51) Int. Cl.
*H04L 5/14*    (2006.01)
(52) U.S. Cl.
CPC .................................... *H04L 5/1461* (2013.01)
(58) Field of Classification Search
None
See application file for complete search history.

(56) References Cited

U.S. PATENT DOCUMENTS

| | | | |
|---|---|---|---|
| 6,218,872 B1* | 4/2001 | Koren | 327/108 |
| 6,438,357 B1* | 8/2002 | Oh et al. | 455/67.14 |
| 2004/0185818 A1* | 9/2004 | Ha et al. | 455/339 |
| 2005/0255810 A1* | 11/2005 | Monroe | 455/78 |
| 2007/0082617 A1* | 4/2007 | McCallister | 455/63.1 |
| 2007/0291823 A1* | 12/2007 | Ben-Bassat | 375/141 |

* cited by examiner

*Primary Examiner* — Huy D Vu
*Assistant Examiner* — James P Duffy
(74) *Attorney, Agent, or Firm* — McDermott Will & Emery LLP

(57) ABSTRACT

A circuit for a large-signal electrical balance duplexer (EBD) may include a circulator that can be configured to couple an output node of a transmit (TX) path to an antenna. An EBD circuit may be coupled to the circulator, at a first port of the EBD circuit. The EBD circuit may be configured to isolate the circulator from one or more input nodes of a receive (RX) path. An attenuator may be coupled between the output node of the TX path and a second port of the EBD circuit. The attenuator may be configured to provide an attenuated signal to the EBD circuit.

20 Claims, 4 Drawing Sheets

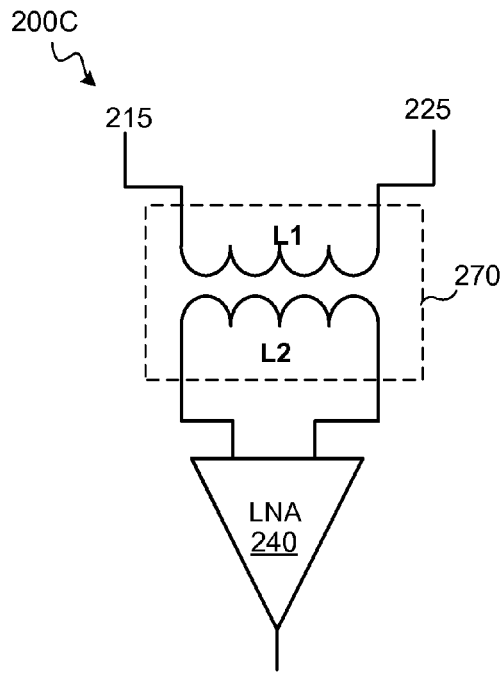
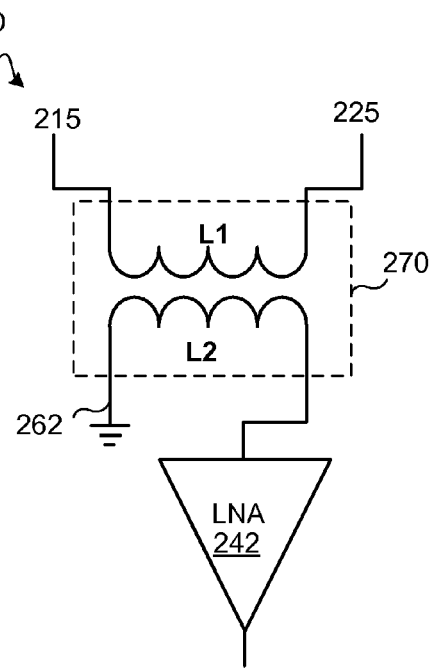
FIG. 2C  FIG. 2D
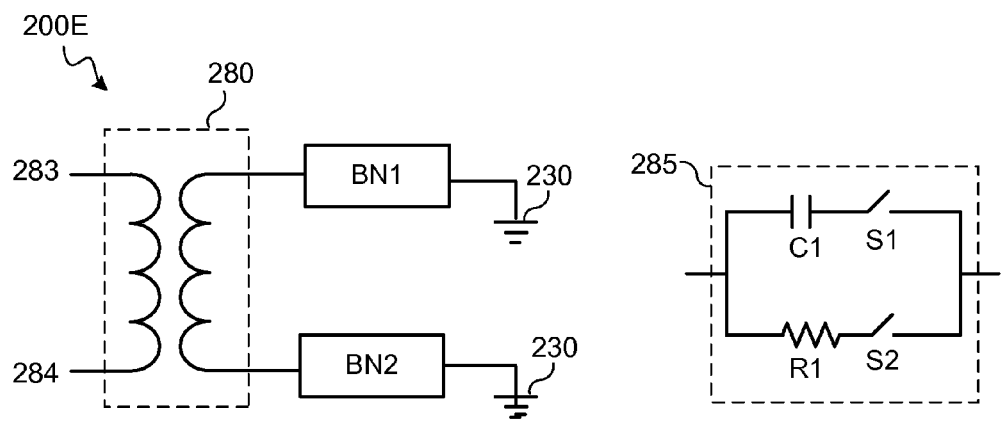
FIG. 2E

LOW-LOSS LARGE-SIGNAL ELECTRICAL BALANCE DUPLEXER

TECHNICAL FIELD

The present description relates generally to radio frequency (RF) communications, and more particularly, but not exclusively, to a low-loss large-signal electrical balance duplexer.

BACKGROUND

Many commercial cellular handsets require multi-band operation. Typically, a 2G/3G cellular transceiver may cover a number of 2G frequency bands (e.g., 850, 900, 1800, and 1900 MHz) and several 3G frequency bands (e.g., bands I, II, III). The existing multi-band approach may be inefficient in term of cost and area. The limitation of such multi-band approach may stem from the need for highly selective radio-frequency (RF) filters, such as SAW filters for 2G and duplexers for 3G operation. With the introduction of new technologies such as 4G and multiple antennas, and the demand to cover more frequency bands, the number of required RF filters and duplexers may increase to an impractical level, in terms of cost and area.

An optimal implementation of a multi-band transceiver may include an antenna-ready radio, completely integrated on a single CMOS chip. One of the missing pieces to realize the single CMOS chip antenna-ready radio is a wideband multi-band RF duplexer, for example, a wideband integrated RF duplexer supporting 3G/4G (e.g., supporting bands, such as bands I, II, III, IV, and IX). The RF duplexer may provide isolation in transmit (TX) band to avoid saturation of the receiver, and also to relax the linearity and phase noise requirement of the receive (RX) path. The conventional duplexers are implemented as two very sharp RF SAW filters. Typical insertion loss of the RF SAW duplexers, for the TX and RX path, may be approximately 2 dB and 2.5 dB, respectively. However, the most challenging specification for an on-chip duplexer may be the large-signal (e.g., 15V peak-to-peak, for a 3G RF duplexer) operation requirement.

Therefore, the need exists for a low-loss RF duplexer that can fulfill the requirements of large-signal operations.

BRIEF DESCRIPTION OF THE DRAWINGS

Certain features of the subject technology are set forth in the appended claims. However, for purpose of explanation, several embodiments of the subject technology are set forth in the following figures.

FIG. 2C illustrates an example low-loss large-signal EBD without a balancing network in accordance with one or more implementations.

FIG. 2D illustrates an example low-loss large-signal EBD without a balancing network for coupling to a single-ended LNA in accordance with one or more implementations.

FIG. 2E illustrates an example balancing network for coupling to the low-loss large-signal EBD of FIG. 2B in accordance with one or more implementations.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

Figure 1A:
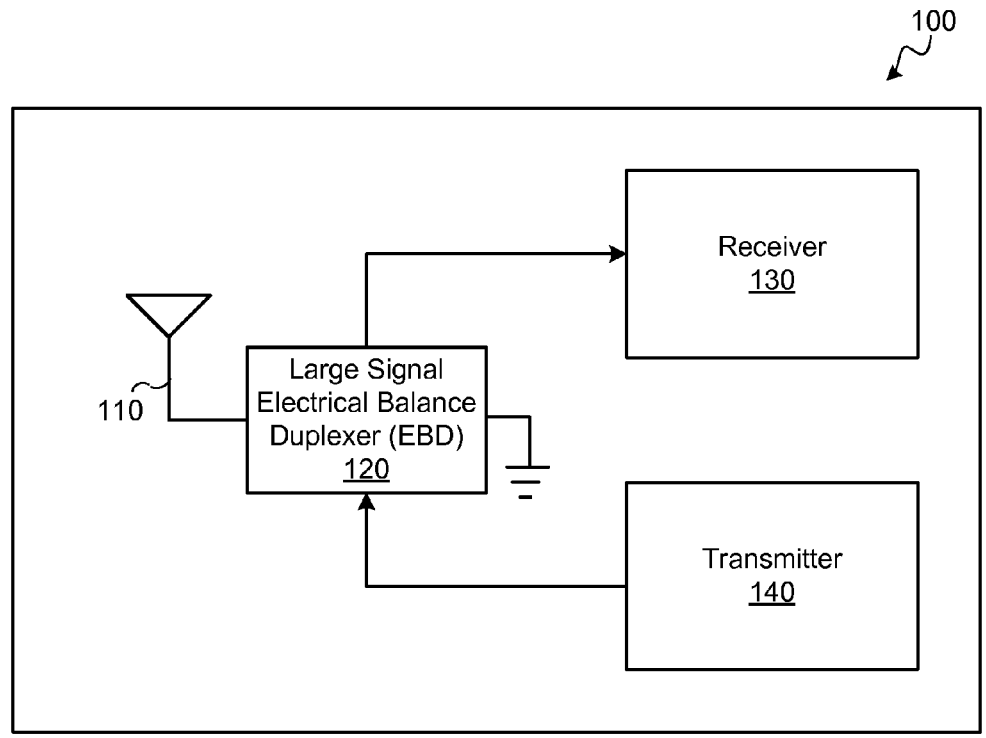
FIG. 1A illustrates an example transceiver using a low-loss large-signal electrical balance duplexer (EBD) in accordance with one or more implementations.

FIG. 1A illustrates an example transceiver using a low-loss large-signal electrical balance duplexer (EBD) in accordance with one or more implementations of the present invention. The RF transceiver 100 may include an antenna 110, a receiver 130, a transmitter 140, and a low-loss large-signal electrical EBD 120. The RF signals received by the antenna 110 may reach the receiver 130 through the low-loss large-signal electrical EBD 120. The RF signals transmitted by the antenna 110 may reach the antenna 110 from the transmitter 140 through the low-loss large-signal electrical EBD 120.

Generally, the role of the RF duplexer in transceivers is to provide a specific isolation (e.g., 50 dB for 3G applications) in the transmit (TX) band, so that the large signals of the TX band are isolated from the receiver (e.g., the receiver 130). This is to avoid saturation of the receiver or damaging the low noise amplifier (LNA) of the receiver, and also to relax the linearity and phase noise requirement of the receiver. Furthermore, the RF duplexer may attenuate the noise in the RX band by approximately 45 dB to push the RX-band noise below the RX noise floor. The conventional RF duplexers are implemented as two very sharp RF SAW filters. Typical insertion loss of the RF SAW duplexers, for the TX and RX path, may be approximately 2 dB and 2.5 dB, respectively. The low-loss large-signal electrical EBD 120 of the subject technology provides a low-loss large-signal solution (e.g., 15V peak-to-peak, for a 3G RF duplexer) that can be integrated with the receiver 130 and the transmitter 140 on a single chip (e.g., silicon chip, such as CMOS chip).

Figure 1B:
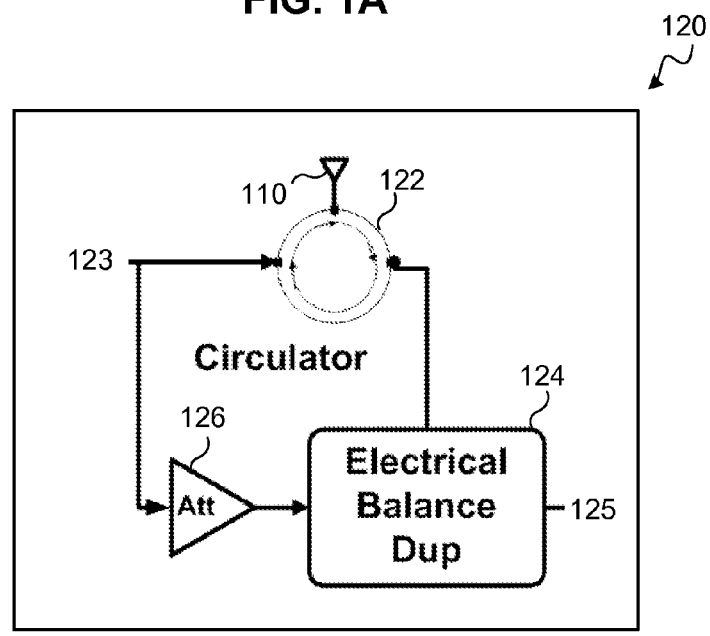
FIG. 1B illustrates an example low-loss large-signal EBD of the transceiver of FIG. 1A in accordance with one or more implementations.

FIG. 1B illustrates an example of the low-loss large-signal EBD 120 of the transceiver 100 of FIG. 1A in accordance with one or more implementations of the present invention. The low-loss large-signal EBD 120 may include a circulator 122, an attenuator 126, and an EBD circuit 124. The circulator 122 may be an RF circulator that is configured to provide a low-loss (e.g., 0.4-0.5 dB) signal path between the antenna 110 and one or more output nodes (e.g., 123) of a TX path (e.g., of transmitter 140 of FIG. 1A). A substantially large isolation in the TX path and the RX path (e.g., >50 dB in the TX path and >45 dB in the RX path) may be provided by the combination of the circulator 122 and the EBD circuit 124. In other words, the EBD circuit 124 may prevent a TX signal from reaching an input node of the RX path (e.g., 125) by providing a 50 dB isolation, and the EBD circuit 124 may suppress a noise, for example, generated by the impedance of the antenna, through reducing the noise by 45 dB. The attenuator 126 may attenuate an amplitude of the signal provided by the output node 123 of the TX path (e.g. 7.5V) sufficiently, so that the burden of tolerating high amplitude signals is removed from the EBD circuit 124. Thus, the EBD circuit 124 does not need to be a large signal duplexer. Accordingly, the EBD circuit 124 may be implemented by using substantially less complex topologies. The circulator 122 and attenuator 126 are known elements in the art, and in the interest of brevity, the description of these elements are excluded from the description herein.

Figure 2A:
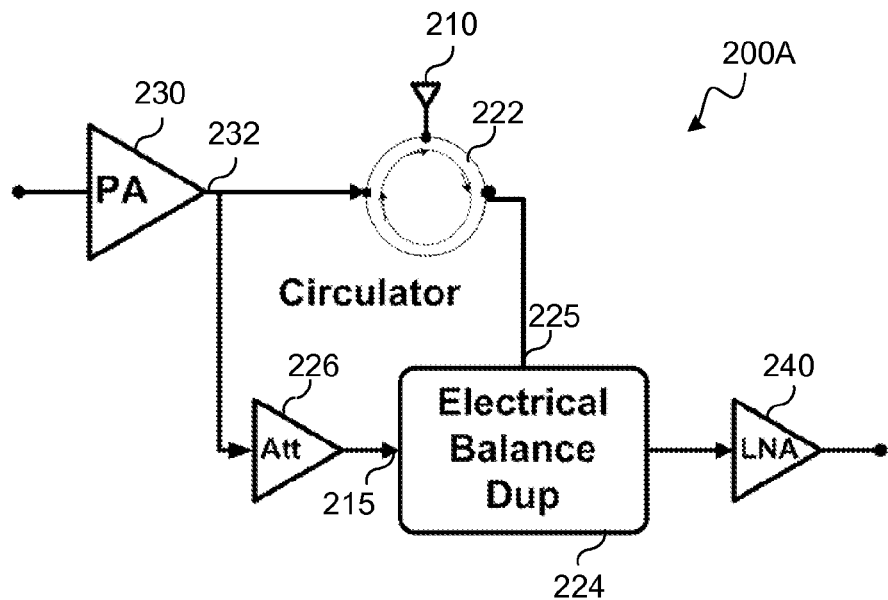
FIG. 2A illustrates an example low-loss large-signal EBD in accordance with one or more implementations.

FIG. 2A illustrates an example low-loss large-signal EBD 200A in accordance with one or more implementations of the present invention. The low-loss large-signal EBD 200A is similar to the low-loss large-signal EBD 120 of FIG. 1B, except that the output node of the TX path (e.g., node 123 of FIG. 1B) is an output node 232 of a power amplifier 230 and the input node of the RX path (e.g., node 125 of FIG. 1B) is one or more input nodes of the low noise amplifier (LNA) 240. The circulator 222 couples the antenna 210 to a port 225 of the EBD circuit 224, which is a small signal duplexer. The attenuator 226 is coupled to a port 215 of the EBD circuit 224. The attenuator 226 may be an adjustable attenuator that can be adjusted to attenuate an output TX signal of the TX path so that the attenuated TX signal is substantially matched with a residual TX signal leaked from the circulator 222 to the first port 225 of the EBD circuit 224.

Figure 2B:
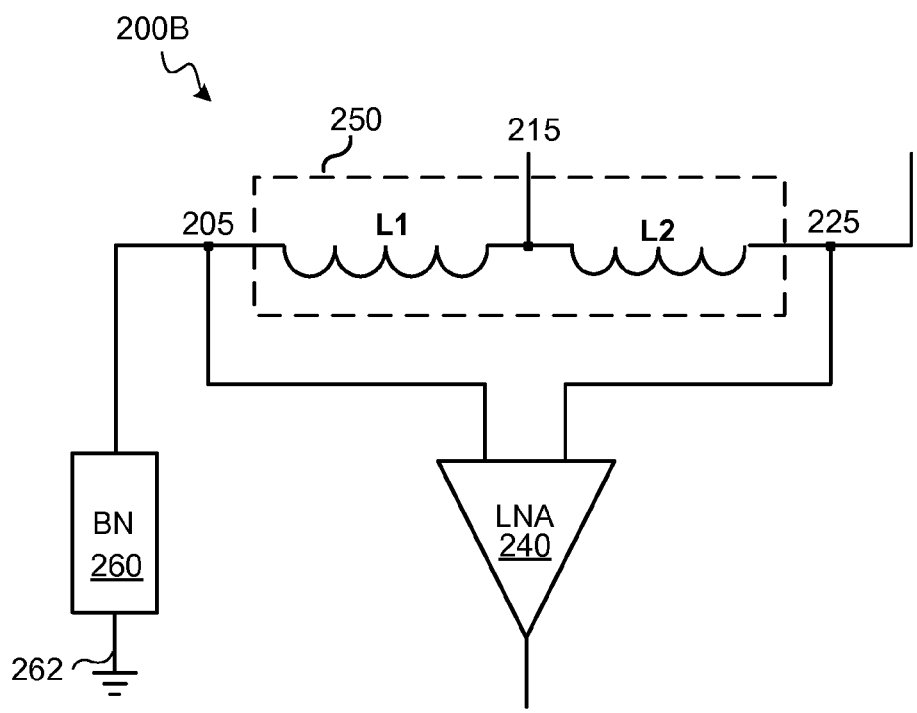
FIG. 2B illustrates an example low-loss large-signal EBD in accordance with one or more implementations.

FIG. 2B illustrates an example EBD circuit 200B in accordance with one or more implementations of the present invention. The EBD circuit 200B includes an auto-transformer 250 and a balancing network 260, coupled between a node 205 of the auto-transformer 250 and ground potential 262. In one or more implementations of the present invention, the EBD circuit 200B may be a wideband and high-isolation duplexer, and can be implemented in CMOS (e.g., silicon CMOS). The EBD circuit 200B may be balanced by selecting an impedance of the balance network 260, so that it matches an impedance of the antenna 210 of FIG. 2A and the circulator 222 of FIG. 2A, as seen from the port 225 of the EBD circuit 200B. Therefore, at balance, there is no net differential voltage across the auto-transformer 250 (e.g., between nodes 205 and 225), and thus, zero self-inductance current flows in the inductors L1 and L2 of the auto-transformer 250. In other words, at balance, the TX signal at port 215, coupled to the attenuator 226 of FIG. 2A is a common-mode signal which can be fully rejected by the differential LNA 240. This scheme may improve the isolation bandwidth of the EBD circuit 200B, which may be only limited by the parasitic signals generated by pads, bondwires, and other parasitic signals. The only limitation of the EBD circuit 200B may be the small signal operation limitation, which in the current application may not be considered a limiting factor. This is because a large signal from the PA 230 of FIG. 2A may be attenuated by the attenuator 226, and furthermore appears at port 215 of the auto-transformer 250 as a common-mode signal that can be fully rejected by the differential LNA 240.

FIG. 2C illustrates an example EBD circuit 200C without a balancing network in accordance with one or more implementations of the present invention. The EBD circuit 200B of FIG. 2B can be further simplified by removing the balancing network 260 and counting on the adjustment of the attenuator 226 of FIG. 2B to balance the voltages at ports 215 and 225 of a transformer 270. It is understood that this balancing is only for the TX signal, a small portion of which (e.g., a residual TX signal) may leak through the circulator 221 of FIG. 2B to the input port 225 of the EBD circuit 200C. The attenuator 226 of FIG. 2B may be adjusted to provide, at input port 215, an attenuated TX signal substantially the same as the residual TX signal at the input port 225, so that the resulting current signal from these TX signals in the inductors L1 and L2 of the transformer 270 is substantially zero. For the RX signal coming only from the port 225, however, the balancing by the attenuator 226 does not apply, and the RX signal appears at the differential inputs of the LNA 240.

FIG. 2D illustrates an example EBD circuit 200D without balancing network for coupling to a single-ended LNA 242 in accordance with one or more implementations of the present invention. The EBD circuit 200D is similar to EBD circuit 200C, except that the LNA 242 is a single-ended LNA connected to one end of the secondary winding of the transformer 270. The other end of the secondary winding of the transformer 270 is connected to ground potential 262. For a TX signal, the attenuator 226 of FIG. 2B, as explained above, may maintain the signal balance between the input nodes 215 and 225 of the transformer 270. Thus, a corresponding current signal through the inductors L1 and L2, and consequently, the voltage signal at the input node of the single-ended LNA 242 can be substantially zero. For an RX signal, the attenuator 226 has no role and the RX signal may only appear at node 225, and can couple to the input node of the single-ended LNA 242, unaffected by the attenuator 226, through the transformer 270.

FIG. 2E illustrates an example balancing network for coupling to the EBD circuit of FIG. 2B in accordance with one or more implementations of the present invention. The balancing network 200E includes impedance blocks BN1 and BN2 that can be coupled to the EBD circuit 200B via a transformer 280, where the nodes 283 and 284 of a secondary winding of the transformer 280 may be connected, respectively, to nodes 205 and ground potential 262 of FIG. 2B. In one or more implementations, the balancing network 200E may include more than two impedance blocks. Each impedance block (e.g., 285) may include a number of parallel branches (e.g., two branches), where each branch may include a passive element (e.g., a resistor, such as R1 or a capacitor, such as C1), each coupled to ground potential (e.g., 230) through a switch (e.g., switches S1 or S2, such as MOS switches). The ground potential 230 may be the same as the ground potential 262. The equivalent impedance Z3 of the balancing network, seen through nodes 283 and 284 of the transformer 280 may depend on the impedances of the impedance block (e.g., BN1 and BN2) and a turn ratio of the transformer 280. The switches (e.g., S1 and S2) may be controlled via control signals that may adjust the impedance Z3 by adding or removing one or more of the passive elements of the impedance blocks.

Figure 3:
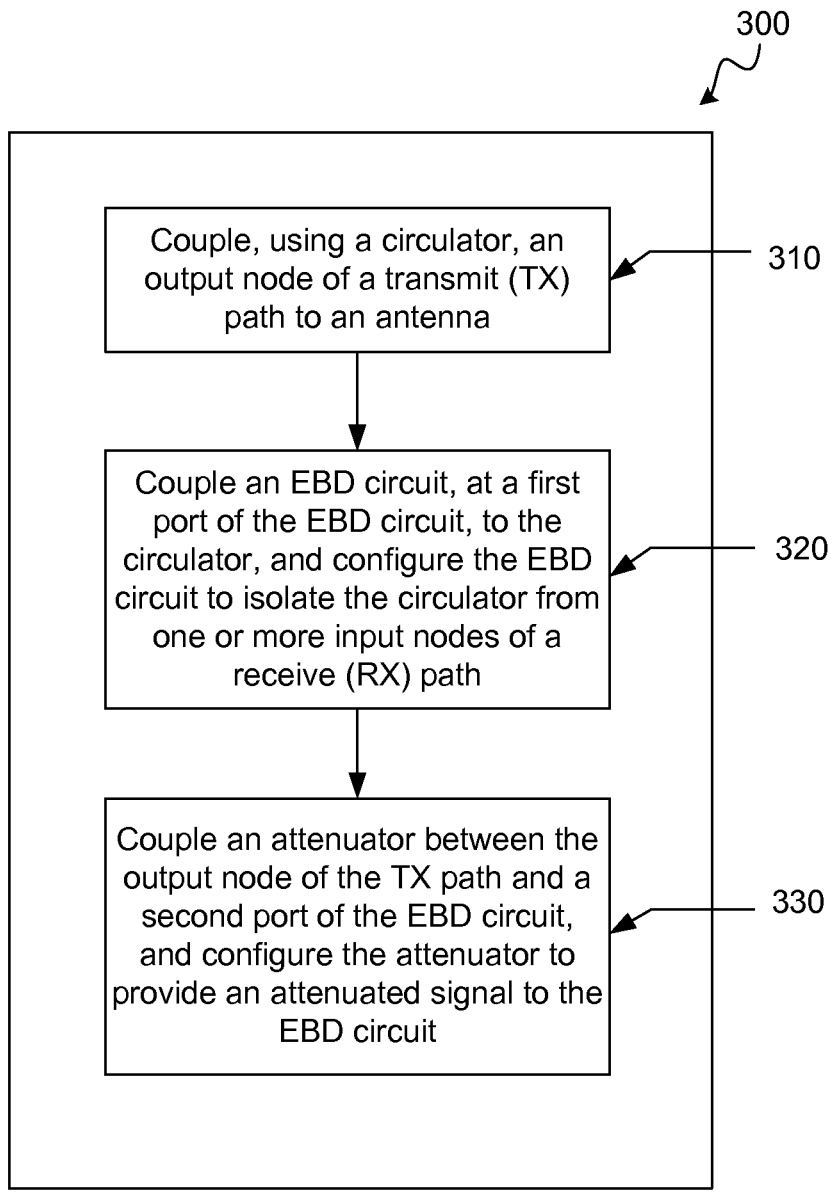
FIG. 3 illustrates an example method for providing a low-loss large-signal EBD in accordance with one or more implementations.

FIG. 3 illustrates an example method 300 for providing a low-loss large-signal EBD in accordance with one or more implementations of the present invention. For explanatory purposes, the example method 300 is described herein with reference to the low-loss large-signal EBD 120 or 200A of FIG. 1B or FIG. 2A, respectively; however, the example method 300 is not limited to the low-loss large-signal EBD 120 or 200A. Further, for explanatory purposes, the blocks of the example method 300 are described herein as occurring in serial, or linearly. However, multiple blocks of the example method 300 may occur in parallel. In addition, the blocks of the example method 300 need not be performed in the order shown and/or one or more of the blocks of the example method 300 need not be performed.

At operation block 310, a circulator (e.g., 122 of FIG. 1B, or 222 of FIG. 2A) may be used to couple an output node of a TX path (e.g., 123 of FIG. 1B, or 232 of FIG. 2A) to an antenna (e.g., 110 of FIG. 1B, or 210 of FIG. 2A). At operation block 320, an EBD circuit (e.g., 124 of FIG. 1B, or 224 of FIG. 2A), at a first port (e.g., 225 of FIG. 2A) of the EBD circuit, may be coupled to the circulator. The EBD circuit may be configured to isolate the circulator from one or more input nodes of an RX path (e.g., 125 of FIG. 1B, or the input node of the LNA 240 of FIG. 2A). An attenuator (e.g., 126 of FIG. 1B, or 226 of FIG. 2A) may be coupled between the output node of the TX path and a second port (e.g., 215 of FIG. 2A) of the EBD circuit (operation block 330). The attenuator may be configured to provide an attenuated signal to the EBD circuit.

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A circuit for a large-signal electrical balance duplexer (EBD), the circuit comprising:
    a circulator configured to couple an output node of a transmit (TX) path to an antenna;
    an EBD circuit coupled to the circulator, at a first port of the EBD circuit, and configured to isolate the circulator from one or more input nodes of a receive (RX) path; and
    an attenuator directly coupled between the output node of the TX path and a second port of the EBD circuit, and configured to provide an attenuated signal to the EBD circuit, wherein the attenuator is an adjustable attenuator and is adjustable to match the attenuated signal with a residual TX signal.

2. The circuit of claim 1, wherein the circulator is configured to provide a low-loss signal path between the output node of the TX path and the antenna, and wherein the output node of the TX path comprises an output node of a power amplifier.

3. The circuit of claim 2, wherein the residual TX signal comprises a signal leaked from the circulator to the first port of the EBD circuit.

4. The circuit of claim 1, wherein the EBD circuit comprises a small-signal EBD, and wherein the small-signal EBD is configured to provide, in combination with the circulator and the attenuator, a low-loss large-signal EBD.

5. The circuit of claim 1, wherein the one or more input nodes of the RX path comprise one or more inputs nodes of a low noise amplifier (LNA), and wherein the LNA comprises a differential LNA.

6. The circuit of claim 1, wherein the EBD circuit comprises an auto-transformer and a balancing network, wherein the auto-transformer comprises a first and a second node and a middle node.

7. The circuit of claim 6, wherein the circulator and the balancing network are, respectively, coupled to the first and the second nodes of the auto-transformer and the attenuator is coupled to the middle node of the auto-transformer.

8. The circuit of claim 6, wherein the EBD circuit comprises a transformer configured to couple one or more inputs nodes of the RX path to the circulator and the attenuator.

9. A method of providing a large-signal electrical balance duplexer (EBD), the method comprising:
  coupling, using a circulator, an output node of a transmit (TX) path to an antenna;
  coupling an EBD circuit, at a first port of the EBD circuit, to the circulator, and configuring the EBD circuit to isolate the circulator from one or more input nodes of a receive (RX) path; and
  coupling an attenuator directly between the output node of the TX path and a second port of the EBD circuit, and configuring the attenuator to provide an attenuated signal to the EBD circuit, wherein the attenuator is an adjustable attenuator and is adjustable to match the attenuated signal with a residual TX signal.

10. The method of claim 9, further comprising configuring the circulator to provide a low-loss signal path between the output node of the TX path and the antenna, and wherein the output node of the TX path comprises an output node of a power amplifier.

11. The method of claim 10, wherein the residual TX signal comprises a signal leaked from the circulator to the first port of the EBD circuit.

12. The method of claim 9, wherein the EBD circuit comprises a small-signal EBD, and the method further comprising configuring the small-signal EBD to provide, in combination with the circulator and the attenuator, a low-loss large-signal EBD.

13. The method of claim 9, wherein the one or more input nodes of the RX path comprise one or more inputs nodes of a low noise amplifier (LNA), and wherein the LNA comprises a differential LNA.

14. The method of claim 9, wherein the EBD circuit comprises an auto-transformer and a balancing network, wherein the auto-transformer comprises a first and a second node and a middle node.

15. The method of claim 14, further comprising coupling the circulator and the balancing network, respectively, to the first and the second nodes of the auto-transformer, and coupling the attenuator to the middle node of the auto-transformer.

16. The method of claim 14, wherein the EBD circuit comprises a transformer, and the method comprises coupling, using the transformer, one or more inputs nodes of the RX path to the circulator and the attenuator.

17. A transceiver circuit comprising:
  an antenna configured to transmit and receive RF signals; and
  a low-loss large-signal electrical balance duplexer (EBD) comprising:
    a circulator configured to couple an output node of a transmit (TX) path of the transceiver to the antenna;
    an EBD circuit coupled to the circulator, at a first port of the EBD circuit, and configured to isolate the circulator from one or more input nodes of a receive (RX) path of the transceiver; and
    an attenuator directly coupled between the output node of the TX path of the transceiver and a second port of the EBD circuit, and configured to provide an attenuated signal to the EBD circuit, wherein the attenuator is an adjustable attenuator and is adjustable to match the attenuated signal with a residual TX signal.

18. The transceiver circuit of claim 17, wherein the circulator is configured to provide a low-loss signal path between the output node of the TX path of the transceiver and the antenna, and wherein the output node of the TX path comprises an output node of a power amplifier.

19. The transceiver circuit of claim 17, wherein the EBD circuit comprises a small-signal EBD, and wherein the small-signal EBD is configured to provide, in combination with the circulator and the attenuator, a low-loss large-signal EBD.

20. The transceiver circuit of claim 17, wherein:
  the residual TX signal comprises a signal leaked from the circulator to the first port of the EBD circuit,
  the one or more input nodes of the RX path of the transceiver comprise one or more inputs nodes of a low noise amplifier (LNA) of the transceiver, and
  the LNA comprises a differential LNA.

\* \* \* \* \*